No. 690,594. Patented Jan. 7, 1902.
A. LONERGAN.
TRAVELER.
(Application filed May 2, 1901.)
(No Model.) 2 Sheets—Sheet 1.
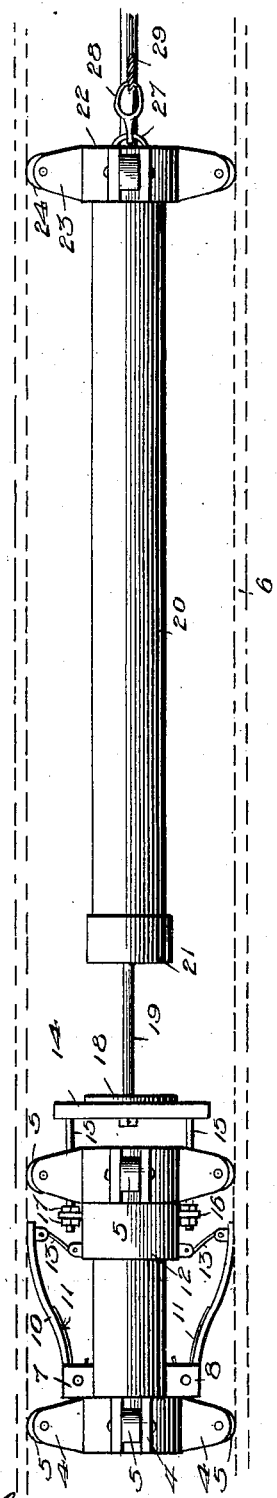
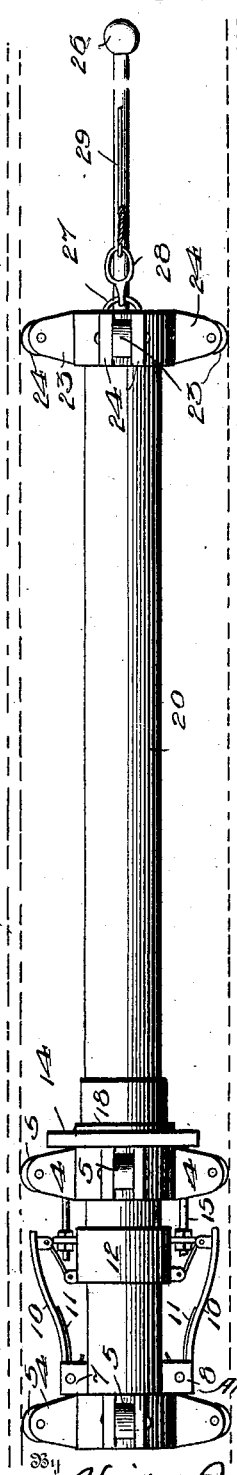
Witnesses
Inventor
A. Lonergan,
Victor J. Evans
Attorney
THE NORRIS PETERS CO., PHOTO-LITHO., WASHINGTON, D. C.

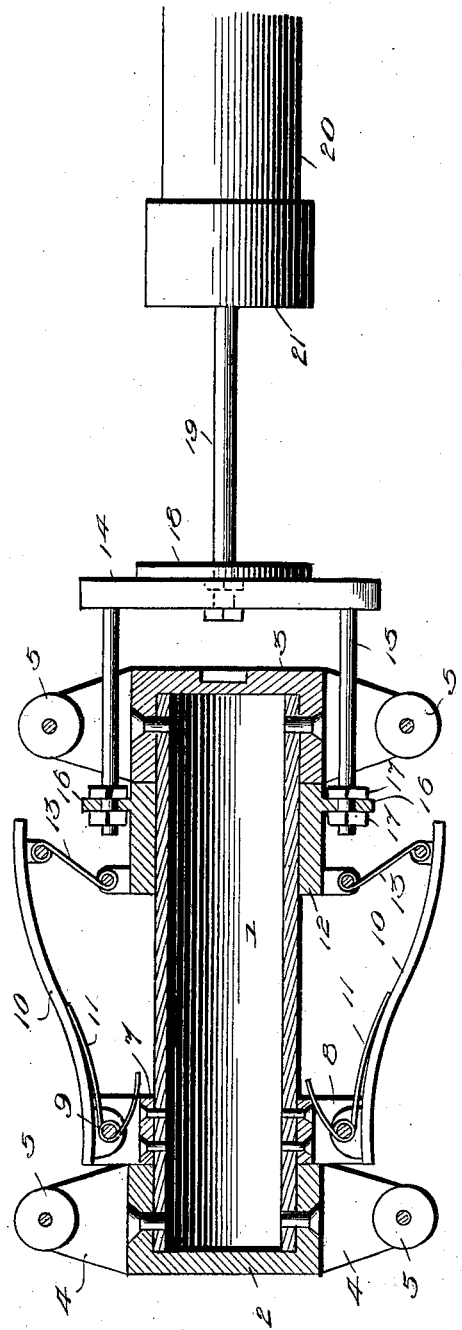

UNITED STATES PATENT OFFICE.

ALPHONSUS LONERGAN, OF NEW YORK, N. Y.

TRAVELER.

SPECIFICATION forming part of Letters Patent No. 690,594, dated January 7, 1902.

Application filed May 2, 1901. Serial No. 58,512. (No model.)

*To all whom it may concern:*

Be it known that I, ALPHONSUS LONERGAN, a citizen of the United States, residing at New York, in the county of New York and State of New York, have invented new and useful Improvements in Travelers, of which the following is a specification.

This invention relates to travelers for pipes or conduits; and the object in view is to provide a mechanical device adapted by suitable mechanism to travel or advance itself through an underground pipe or conduit for the purpose of leading an electric or other wire or a rope or cable through the conduit.
One of the principal aims of the present invention is to provide a traveler having clutch members so arranged in connection with a driver that the clutch members will be operated by the driver for alternately engaging and releasing their hold upon the inner surface of the pipe or conduit, the driver itself being controlled by the cord, cable, or wire which is being led through the pipe or conduit.

With the above general objects in view the invention consists in the novel construction, combination, and arrangement of parts hereinafter fully described, illustrated, and claimed.

In the accompanying drawings, Figure 1 is a plan view of a traveler constructed in accordance with the present invention, showing the clutch members in engagement with the pipe or conduit, the latter being shown in dotted lines. Fig. 2 is a similar view showing the clutch members thrown out of engagement with the pipe. Fig. 3 is an enlarged detail section through the traveler-body, showing the means for operating the clutch members, which are shown as drawn inward. Fig. 4 is a longitudinal section through the driver, showing the actuating-spring and connecting guide-rod.

Similar numerals of reference designate corresponding parts in all figures of the drawings.

In the preferred embodiment of this invention the traveler is composed of a hollow or tubular body 1, to the opposite ends of which are fitted heads or caps 2 and 3, 2 designat-
ing the forward head, and 3 the rear head, of the traveler-body. The traveler-heads 2 and 3 are each provided with twin bracket arms or ears 4, and between each pair of arms is journaled a roller 5, the several rollers on the two traveler-heads forming a sort of truck adapted to roll in contact with the inner surface of the pipe or conduit in the manner illustrated in Figs. 1 and 2. Any number of rollers 5 may be employed, and a sufficient number is employed to hold the traveler-body centrally, or approximately so, within the pipe or conduit, which is indicated at 6.

Surrounding the traveler-body 1 is a sleeve 7, having outwardly-projecting ears or brackets 8, to which are pivotally connected at 9 the forward ends of a plurality of clutch members 10. These clutch members are preferably shown of ogee shape, with their outer movable ends adapted to be thrown into and out of contact with the inner wall of the pipe or conduit, as illustrated, respectively, in Figs. 1 and 2. These clutch members are normally pressed outward by means of springs 11, coiled around the pivots 9 and having one end brought to bear against the inside of its respective clutch member, while the opposite end of the spring rests against the sleeve 7 or other fixed part of the traveler-body. In order to throw the clutch members outward and inward, I provide a runner 12, which is in the form of a sleeve encircling the traveler-body and adapted to slide lengthwise thereof, the said sleeve being connected with the movable ends of the clutch members by means of interposed pivotal links 13, constituting toggle members or connections between the clutch members and runner, so that as the runner is moved back and forth the clutch members are thrown outward and inward. The runner 12 is actuated by means of a bumper-head 14, having guide-stems 15, which pass through lugs 16 on the runner and are adjustably connected with said lugs by means of nuts 17, engaging the stems 15 on opposite sides of the lugs 16. The bumper-head 14 is arranged in rear of the traveler-head 3 and is movable toward and away from said traveler-head. The said bumper-head is also provided upon its rear side with a cushion 18, of leather, rubber, or similar material, adapted to receive the impact of the driver.

Connected to the bumper-head 14 is a connecting guide-rod 19, which connects the bumper-head with the driver, (indicated at 20,) the said rod 19 passing centrally through the driver, which is preferably in the form of a section of pipe or tubing provided at its forward end with an impact-head 21, secured in any convenient manner thereto and having at its opposite or rear end a head 22, having bracket-arms 23, carrying supporting-rollers 24, for a purpose similar to those (5) hereinabove described. The head 22 is fixed upon the rear end of the body of the driver. Arranged within the body of the driver is an impelling or thrust spring 25, which encircles the connecting guide-rod 19 and also connects said guide-rod with one end of the driver. The driver is mounted to slide lengthwise upon the connecting guide-rod 19, and the latter is provided at its rear end with an enlargement 26, forming a stop which limits the rearward movement of the driver on the stem. The driver is also provided at its rear end with an eye 27, adapted to receive a hook 28 or other suitable coupling device, which is connected to the adjacent end of the cord, rope, cable, or wire 29 which is to be led or carried by the traveler through the pipe or conduit.

In operation the traveler is placed in the initial end of the pipe or conduit to be traversed, after which the operator draws backward on the cable 29, which places the spring 25 under tension and at the same time causes the clutch members to be thrown into engagement with the inner surface of the pipe or conduit, which operation of the clutch members is brought about by the rearward movement of the runner 12, acted upon by the bumper-head 14, in turn drawn in a rearward direction by the connecting guide-rod 19 under the resistance of the impelling or thrust-spring 25. Upon quickly releasing the cable 29 the driver is thrown forward by the spring 25 and brought into forcible contact with the bumper-head, which is in turn driven into contact with the rear traveler-head 3, thus drawing the clutch members inward and imparting a blow to the traveler which will cause both the traveler and driver to move forward within the pipe or conduit, the distance of travel being proportionate to the force of the blow imparted to the traveler-body by the driver. This pulling and releasing of the cable 29 is repeated rapidly, and the traveler is thus advanced along the pipe or conduit until an accessible point is reached, where the cable 29 may be disconnected from the traveler and operated by hand, either for laying the cable itself in place within the conduit or subsequently attaching another electric cable or the like to the first cable and by means thereof drawing the second wire or cable through the conduit.

I do not desire to be limited to the details of construction hereinabove set forth, as other means may be employed for imparting successive blows to the traveler for causing the same to traverse the pipe or conduit. I therefore reserve the right to make such changes as come within the scope of the appended claims.

Having thus fully described my invention, what I claim as new, and desire to secure by Letters Patent, is—

1. In a traveler for the purpose specified, a traveler-body provided with movable clutch members mounted thereon, a bumper connected with said clutch members so as to move the same inward and outward, a driver, and means for throwing the driver in forcible contact with the bumper.

2. In a traveler for the purpose specified, a traveler-body, movable clutch members mounted thereon, a runner for moving said clutch members outward and inward, a driver adapted to be thrown in forcible contact with the traveler for propelling the latter, the driver also serving to operate the clutch members, and means for impelling the driver.

3. In a traveler for the purpose specified, a traveler-body, clutch members pivotally connected thereto, a runner slidingly mounted with respect to the traveler-body, and operatively connected to the movable ends of the clutch members, a bumper-head coupled to the runner, and a spring-actuated driver adapted to operate against the bumper-head.

4. In a traveler for the purpose specified, a traveler-head, movable clutch members mounted thereon, a runner operatively connected to the clutch members, a bumper-head adjustably connected to the runner, and a spring-actuated driver adapted to be thrown against the bumper-head.

5. In a traveler for the purpose specified, the combination with a traveler-body, and movable clutch members carried thereby, of a runner operatively connected with the clutch members, means for normally holding the clutch members outward, a bumper-head connected to the runner, and a spring-actuated driver adapted to be impelled against the bumper-head.

6. In a traveler for the purpose specified, the combination with the traveler-body, and clutch members carried thereby, of a bumper-head operatively connected with the clutch members, a connecting guide-rod attached to said bumper-head, and a spring-actuated driver mounted on said connecting guide-rod.

7. In a traveler for the purpose specified, a traveler-body, movable clutch members carried thereby, a runner operatively connected with said clutch members, a bumper coupled to the runner, a cushion on said bumper, a driver arranged to be thrown into contact with said cushion, and a guide-rod connecting the bumper and driver.

8. In a traveler for the purpose specified, a traveler-body provided at each end with centering and carrying rollers, in combination with movable clutch members carried by the traveler-body and mounted between the rollers at each end of the traveler-body, a driver adapted to propel the traveler-body and provided at one end with centering and carrying rollers, and a guide-rod connecting the traveler-body and driver.

In testimony whereof I affix my signature in presence of two witnesses.

ALPHONSUS LONERGAN.

Witnesses:
CHAS. E. HAYDEN,
JAMES B. NORRIS.